(12) United States Patent
Wu

(10) Patent No.: US 11,833,429 B2
(45) Date of Patent: Dec. 5, 2023

(54) E-GAMING ENTERTAINMENT SYSTEM

(71) Applicant: GENOVA INC, Diamond Bar, CA (US)

(72) Inventor: Peng Wu, Shanghai (CN)

(73) Assignee: GENOVA INC, Diamond Bar, CA (US)

( * ) Notice: Subject to any disclaimer, the term of this patent is extended or adjusted under 35 U.S.C. 154(b) by 0 days.

(21) Appl. No.: 17/965,799

(22) Filed: Oct. 14, 2022

(65) Prior Publication Data
US 2023/0321542 A1 Oct. 12, 2023

(30) Foreign Application Priority Data
Apr. 7, 2022 (CN) .......................... 202210373782.8

(51) Int. Cl.
| | | |
|---|---|---|
| *A63F 13/00* | (2014.01) | |
| *A63F 13/54* | (2014.01) | |
| *G10L 15/22* | (2006.01) | |
| *H04R 3/04* | (2006.01) | |
| *H04R 5/02* | (2006.01) | |

(Continued)

(52) U.S. Cl.
CPC ............ *A63F 13/54* (2014.09); *A63F 13/215* (2014.09); *A63F 13/537* (2014.09); *G06F 3/165* (2013.01); *G10L 15/22* (2013.01); *H04R 3/04* (2013.01); *H04R 5/023* (2013.01); *H04R 5/04* (2013.01); *H04S 3/008* (2013.01); *H05B 47/175* (2020.01); *A63F 2300/303* (2013.01); *A63F 2300/6072* (2013.01); *A63F 2300/6081* (2013.01); *G10L 2015/223* (2013.01); *H04S 2400/01* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 6,359,636 B1 * | 3/2002 | Schindler ......... | H04N 21/41265 348/E7.071 |
| 6,628,964 B1 * | 9/2003 | Bates ................ | H04M 1/72415 348/14.05 |

(Continued)

*Primary Examiner* — Paul A D'Agostino
(74) *Attorney, Agent, or Firm* — Bayramoglu Law Offices LLC

(57) ABSTRACT

An e-gaming entertainment system includes a central control platform, a plurality of light devices and a plurality of audio devices. The central control platform receives light adjustment instructions or sound adjustment instructions, converts the light adjustment instructions or the sound adjustment instructions into light adjustment execution commands or sound adjustment execution commands, and sends the light adjustment execution commands or the sound adjustment execution commands through a wired or wireless way forward to the light devices or audio devices correspondingly. The light devices receive the light adjustment execution commands and perform light adjustment operations. The audio devices receive the sound adjustment execution commands and perform sound adjustment operations. The e-gaming entertainment system is efficient and convenient. The central control platform controls multiple light devices and audio devices in a wireless or wired manner. Also, the connected devices can be increased or decreased flexibly.

4 Claims, 2 Drawing Sheets

(51) Int. Cl.
  *H04R 5/04*   (2006.01)
  *H04S 3/00*   (2006.01)
  *A63F 13/537* (2014.01)
  *A63F 13/215* (2014.01)
  *H05B 47/175* (2020.01)
  *G06F 3/16*   (2006.01)

(56) References Cited

U.S. PATENT DOCUMENTS

| | | | | |
|---|---|---|---|---|
| 2003/0057884 A1* | 3/2003 | Dowling | ............... | A63F 13/285 |
| | | | | 315/291 |
| 2004/0095317 A1* | 5/2004 | Zhang | ................. | G06F 3/0346 |
| | | | | 345/158 |
| 2004/0266419 A1* | 12/2004 | Arling | .................... | G08C 25/02 |
| | | | | 455/92 |
| 2005/0275626 A1* | 12/2005 | Mueller | ................. | H05B 47/19 |
| | | | | 345/156 |
| 2005/0278764 A1* | 12/2005 | Barr | ....................... | H04N 5/765 |
| | | | | 725/100 |
| 2006/0096445 A1* | 5/2006 | Leach | ..................... | A63J 17/00 |
| | | | | 84/453 |
| 2006/0268538 A1* | 11/2006 | Hansel | ..................... | F21V 33/00 |
| | | | | 362/84 |
| 2007/0149291 A1* | 6/2007 | Mitchell | ................. | G07F 17/32 |
| | | | | 463/46 |
| 2009/0170602 A1* | 7/2009 | Martin | ................. | G07F 17/3227 |
| | | | | 463/39 |
| 2009/0206773 A1* | 8/2009 | Chang | .................... | H05B 45/20 |
| | | | | 315/297 |
| 2009/0313660 A1* | 12/2009 | Ni | ...................... | H04N 21/4221 |
| | | | | 348/E5.103 |
| 2011/0207423 A1* | 8/2011 | Tarte | ...................... | H04H 40/18 |
| | | | | 455/186.1 |
| 2012/0129601 A1* | 5/2012 | Gronkowski | ........ | G07F 17/3239 |
| | | | | 463/31 |
| 2014/0233747 A1* | 8/2014 | Fox | .................. | G10K 11/17861 |
| | | | | 381/71.1 |
| 2014/0259967 A1* | 9/2014 | Ferguson | .................. | E04H 3/22 |
| | | | | 52/9 |
| 2015/0125012 A1* | 5/2015 | Sabin | ................. | H04R 25/505 |
| | | | | 381/314 |
| 2016/0054837 A1* | 2/2016 | Stafford | ................. | G02B 27/01 |
| | | | | 463/33 |
| 2016/0292955 A1* | 10/2016 | Gronkowski | ....... | G07F 17/3269 |
| 2017/0065890 A1* | 3/2017 | Taylor | ................. | G07F 17/3204 |
| 2018/0295461 A1* | 10/2018 | Di Censo | ................ | H04S 7/303 |
| 2020/0242887 A1* | 7/2020 | Achmueller | ........ | G07F 17/3206 |

* cited by examiner

E-GAMING ENTERTAINMENT SYSTEM

CROSS REFERENCE TO THE RELATED APPLICATIONS

This application is based upon and claims priority to Chinese Patent Application No. 202210373782.8, filed on Apr. 7, 2022, the entire contents of which are incorporated herein by reference.

TECHNICAL FIELD

The present invention belongs to the field of audio entertainment and lighting control technology and, particularly, relates to an e-gaming entertainment system.

BACKGROUND

As Internet application technology becomes more and more mature, individual users have ever-increasing demands for watching movies, singing, gaming and other entertainment activities at home, which are conducive to the widespread use of e-gaming audio entertainment systems. An e-gaming audio entertainment system includes multiple speakers configured for simultaneously outputting multi-channel audio to achieve high-quality audio effects, and multiple RGB LED light devices in multiple locations to radiate a variety of colored lights to achieve immersive lighting effects during the game competition.

When an existing e-gaming audio entertainment system is mounted, large audio equipment and light equipment are hung in the ceiling or wall by means of drilling the wall, wiring, and construction. Besides, different controllers are required to control different light devices and audio playing devices. However, this method is time-consuming, high cost, and requires construction, which may damage the original decoration, and cause security risks.

SUMMARY

Based on the above-mentioned technical problem, the present invention provides an e-gaming entertainment system.

To solve the above-mentioned technical problem, the present invention adopts the following technical solution.

An e-gaming entertainment system includes a central control platform, a plurality of light devices and a plurality of audio devices. The central control platform receives light adjustment instructions or sound adjustment instructions, converts the light adjustment instructions or the sound adjustment instructions into light adjustment execution commands or sound adjustment execution commands, and sends the light adjustment execution commands or the sound adjustment execution commands through a wired or wireless way forward to the light devices or the audio devices correspondingly. The light devices receive the light adjustment execution commands and perform light adjustment operations. The audio devices receive the sound adjustment execution command and perform sound adjustment operations.

Preferably, the e-gaming entertainment system further includes a computer terminal and/or a mobile communication terminal. The computer terminal and/or the mobile communication terminal are used to send the light adjustment instructions or the sound adjustment instructions to the central control platform.

Preferably, the central control platform further includes a speech recognition module for receiving the light adjustment instructions and the sound adjustment instructions through speech recognition.

Preferably, the central control platform further includes a plurality of key units for receiving the light adjustment instructions or the sound adjustment instructions by a user operations applied on the key units.

Preferably, the light adjustment instructions or the sound adjustment instructions include identification (ID) information of the corresponding devices.

Preferably, the light adjustment instructions include light color adjustment instructions, light brightness adjustment instructions, light on-off instructions, and blinking mode adjustment instructions.

Preferably, the sound adjustment instructions includes sound volume adjustment instructions, high and low pitch adjustment instructions, sound channel mode adjustment instructions, and sound on-off instructions.

Preferably, the plurality of light devices includes a mouse, a keyboard, a microphone, a mouse pad, an e-gaming table and an RGB LED light strip.

Preferably, the plurality of audio devices include an e-gaming chair audio playing device, an audio playing device.

The e-gaming entertainment system of the present invention is efficient and convenient. A central control platform controls multiple light devices and audio devices in a wireless or wired manner to adjust light and sound in a variety of ways. Also, the devices connected to the system can be increased or decreased flexibly, without damaging the original decoration, and multiple remote controls are not required for each light device and audio device, making the control operations convenient and easy.

DETAILED DESCRIPTION OF THE EMBODIMENTS

Embodiments of the present invention will be described below in conjunction with the drawings of the specification. It should be noted that the embodiments described in this specification are not exhaustive and do not represent the only embodiment of the present invention. The following corresponding embodiments are only for the purpose of clearly illustrating the content of the present invention, rather than limiting the implementation. For a person of ordinary skill in the art, different variations and modifications can be made based on the description of the embodiments, and any variation or change that belongs to the technical conception and inventive content of the invention or any obvious change or variation based on the former are all within the scope of protection of the present invention.

Figure 1:
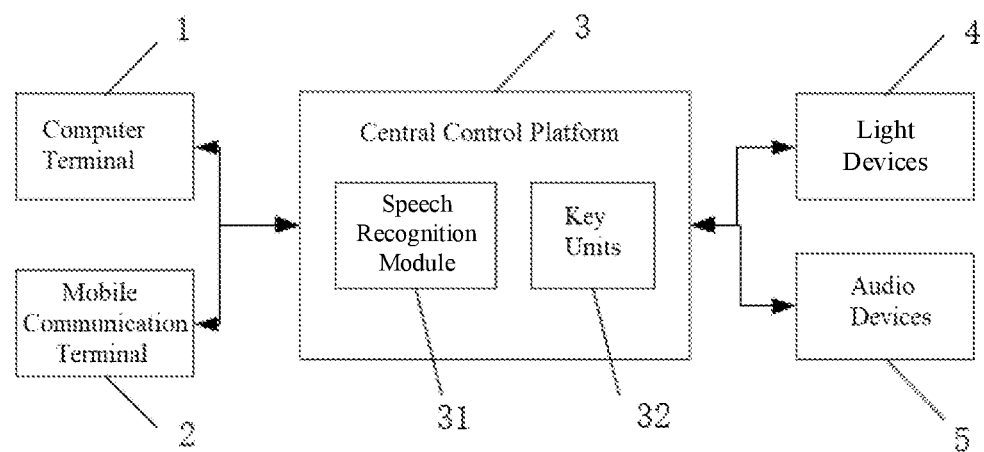
FIG. 1 is a schematic diagram showing the structure of the e-gaming entertainment system of the present invention.
Figure 2:
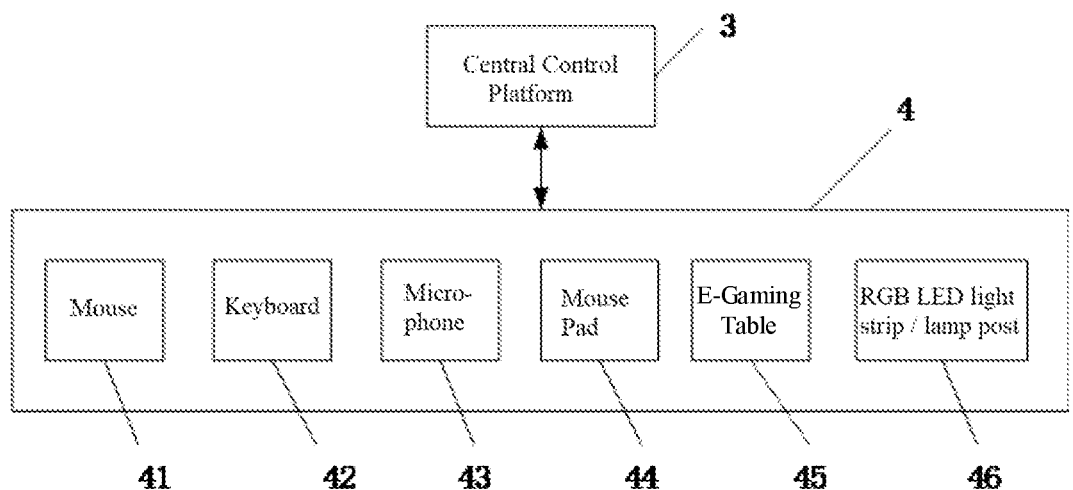
FIG. 2 is a schematic diagram showing the connection between the central control platform and the light devices of the e-gaming entertainment system of the present invention.
Figure 3:
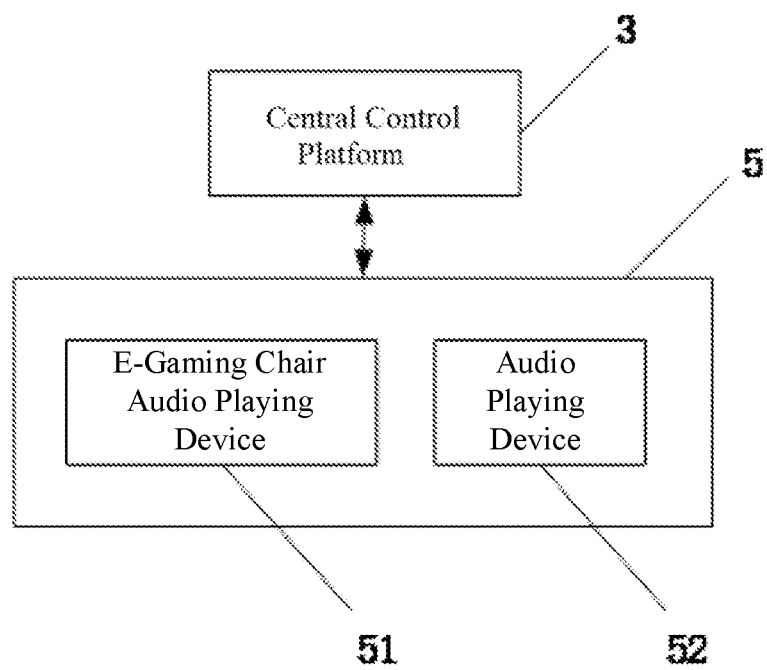
FIG. 3 is a schematic diagram showing the connection between the central control platform and the audio devices of the e-gaming entertainment system of the present invention.

As shown in FIG. 1-FIG. 3, the e-gaming entertainment system of the present invention includes: the computer terminal 1, the mobile communication terminal 2, the central control platform 3, the plurality of light devices 4 and the plurality of audio devices 5.

The computer terminal 1 and mobile communication terminal 2 are used to send light adjustment instructions and sound adjustment instructions to the central control platform 3. The computer terminal 1 can be a personal computer, a laptop, a tablet PC, or other devices. The computer terminal 1 has a corresponding software program installed, and the user sends the light adjustment instructions or the sound adjustment instructions through the human-computer interaction interface of the program. Mobile communication terminal 2 can be a smartphone. The smartphone has a corresponding APP installed, and the user sends the light adjustment instructions or the sound adjustment instructions through the human-computer interaction interface of the APP.

The human-computer interaction interface displays the plurality of light devices 4 and the plurality of audio devices 5. The user can select and adjust any one of the devices. The selection of the user is carried out by clicking the mouse connected to the personal computer or through the touch screen of the smartphone. In addition, the human-computer interaction interface also displays information, such as the current status and battery level of the connected devices.

The above-mentioned light adjustment instructions or sound adjustment instructions include the identification (ID) information corresponding to the devices. For example, in the light device 4, the ID information of the mouse is 010001, and the ID information of the keyboard is 010002. Preferably, the light adjustment instructions include light color adjustment instructions, light brightness adjustment instructions, light on-off instructions, and blinking mode adjustment instructions. The sound adjustment instructions include sound volume adjustment instructions, high and low pitch adjustment instructions, sound channel mode adjustment instructions, and sound on-off instructions.

The central control platform 3 receives the light adjustment instructions or the sound adjustment instructions, converts the light adjustment instructions or the sound adjustment instructions into light adjustment execution commands or sound adjustment execution commands, and sends the light adjustment execution commands or the sound adjustment execution commands through a wired or wireless way forward to the light device 4 or audio device 5 correspondingly. Since the light adjustment commands or the sound adjustment commands contain the ID information of the corresponding devices, after the central control platform 3 converts the adjustment instructions into the execution commands, the execution commands still contain the ID information of the adjusted devices, so that the central control platform 3 can send the relevant light adjustment execution command or sound adjustment execution command to the corresponding light device 4 or audio device 5.

Preferably, the central control platform 3 further includes the speech recognition module 31 for receiving the light adjustment instructions and the sound adjustment instructions through speech recognition. The speech recognition module 31 translates the speech into corresponding instructions by recognizing the speech of the user. Preferably, the speech recognition module 31 is provided with a wake-on voice to activate/start the speech recognition function by means of a pre-set wake-on voice. An example of the wake-on voice is "Hello Xiao G". When the wake-on voice is received, the central control platform 3 sends out a response speech or short music such as "Di Di Di" to indicate that it has been awaken and is ready to receive speech instructions. Then, when the user says "turn on the light of the mouse", the speech recognition module 31 converts the speech into a light adjustment instruction that includes the device ID of the mouse. In another preferred embodiment, the central control platform 3 has a key to activate the speech recognition function (the key may be named as "speech" key), so that the user can manually operate the key to activate the speech recognition function. For example, the user can long-press the "speech" key on the central control platform 3 to activate the speech recognition function. After the key is long-pressed, the central control platform 3 sends out a response speech or short music such as "Di Di Di" to indicate that it has been awakened and is ready to receive speech instructions. Then, when the user says "turn on the light of the mouse", the speech recognition module 31 converts the speech into a light adjustment instruction that includes the device ID of the mouse.

Preferably, the central control platform 3 further includes a plurality of key units 32 for receiving the light adjustment instructions or the sound adjustment instructions by user operations applied on the key units 32. Specifically, the plurality of key units 32 includes a device selection key, a volume adjustment key, a light adjustment key, and the aforementioned key for activating the speech recognition function, so that the user can perform manual key operations to adjust the effect of lights and sounds.

In addition, the central control platform 3 also has a WIFI multi-transmitter module, a Bluetooth multi-transmitter module to enable WIFI multi-transmitter function and Bluetooth multi-transmitter function to wirelessly control/connect multiple light devices 4 and/or multiple audio devices 5. The central control platform 3 also has a plurality of USB ports for connecting with multiple light devices 4 and/or multiple audio devices 5 via wires in case of a wired connection.

The light device 4 receives the light adjustment execution command and performs the light adjustment operation. Specifically, the plurality of light devices 4 includes the mouse 41, the keyboard 42, the microphone 43, the mouse pad 44, the e-gaming table 45, and the RGB LED light strip/lamp post 46. The mouse 41, the keyboard 42, the microphone 43, the mouse pad 44, the e-gaming table 45 and other parts are commercially available products with a light strip that can emit light. These products all have USB communication chips, WIFI modules, and Bluetooth receivers. Among them, the RGB LED strip/lamp post 46 can be an RGB LED strip (or RGB LED lamp post 46) with a USB communication chip, a WIFI module, and a Bluetooth receiver.

The audio device 5 receives the sound adjustment execution command and performs the sound adjustment operation. The audio device in the present patent generally refers to a device for playing audio. Specifically, the plurality of audio devices 5 includes the e-gaming chair audio playing device 51 and the audio playing device 52. The e-gaming chair audio playing device 51 is an audio playing device arranged in the e-gaming chair, and includes a USB communication chip, a WIFI module and a Bluetooth receiver. Preferably, for example, the e-gaming chair audio playing device 51 is a speaker mounted on the shoulder of the backrest of the e-gaming chair. The audio playing device 52 is a soundbox, including a left sub-soundbox, a right main soundbox and a subwoofer. The right main soundbox has a USB communication chip, a WIFI module, and a Bluetooth receiver. The left sub-soundbox and the subwoofer both have a WIFI module and a Bluetooth receiver. Preferably, the audio playing device 52 may also have the RGB LED light strip 46.

The e-gaming entertainment system of the present invention is efficient and convenient. A central control platform controls multiple light devices and multiple audio devices in a wireless or wired manner. Light and sound can be adjusted in a variety of ways, for example, adjustment instructions are sent by computer terminals, mobile communication terminals, speech recognition and key operations. Also, the connected devices can be increased or decreased flexibly without destroying the original decoration or without multiple remote controls for controlling each light device and audio device, thereby making the control operations convenient and easy.

However, a person of ordinary skill in the art should realize that the above embodiments are used only to illustrate the present invention rather than limiting the present invention. Variations and modifications of the above-described embodiments should fall within the scope of the claims of the present invention as long as they are within the substantial spirit of the present invention.

What is claimed is:

1. A home e-gaming entertainment system, comprising:
   a computer terminal, a mobile communication terminal, a central control platform, a plurality of light devices, and a plurality of audio devices; wherein,
   the computer terminal is a personal computer, a laptop, or a tablet PC;
   the mobile communication terminal is a smartphone;
   the computer terminal and the mobile communication terminal are configured to send light adjustment instructions and sound adjustment instructions to the central control platform;
   the central control platform is configured to receive the light adjustment instructions and the sound adjustment instructions; the central control platform is configured to convert the light adjustment instructions and the sound adjustment instructions into respective light adjustment execution commands and sound adjustment execution commands, and the central control platform is configured to respectively send the light adjustment execution commands and the sound adjustment execution commands through a wired or wireless way to the plurality of light devices and the plurality of audio devices correspondingly;
   the plurality of light devices comprises a mouse, a keyboard, a microphone, a mouse pad, an e-gaming table, and an RGB LED light strip, and the plurality of light devices are configured to receive the light adjustment execution commands and perform light adjustment operations; and
   the plurality of audio devices comprises an e-gaming chair audio playing device and a soundbox, and the plurality of audio devices are configured to receive the sound adjustment execution commands and perform sound adjustment operations;
   wherein the light adjustment instructions comprise light color adjustment instructions, light brightness adjustment instructions, light on-off instructions, and blinking mode adjustment instructions;
   wherein the sound adjustment instructions comprise sound volume adjustment instructions, high and low pitch adjustment instructions, sound channel mode adjustment instructions, and sound on-off instructions;
   wherein each of the plurality of light devices comprises a user-interface and a light source that is separate from the user-interface, wherein the user-interface is configured to receive a given light adjustment execution command of the light adjustment execution commands to control the light source to adjust at least one of light color, or light brightness, light on-off, or light blinking of light output from the light source, and the given light adjustment execution command comprises an identifier that identifies the user-interface, wherein the user-interface comprises at least one of a first universal serial bus (USB) communication chip, a first WiFi module, or a first Bluetooth receiver; and
   wherein the central control platform further comprises a speech recognition module, the speech recognition module is configured to receive a wake-on voice to activate a speech recognition function, after the activation of the speech recognition function the central control platform sends out a response speech or short music to indicate the central control platform is ready to receive the light adjustment instructions and the sound adjustment instructions through speech recognition of a user, resulting in a control of the light adjustment or the sound adjustment of one or more of the mouse, the keyboard, the microphone, the mouse pad, the e-gaming table, the RGB LED light strip, the e-gaming chair audio playing device, and the sound box.

2. The e-gaming entertainment system according to claim 1, wherein,
   the central control platform further comprises a plurality of key units for receiving the light adjustment instructions and the sound adjustment instructions by user operations applied on the plurality of key units.

3. The e-gaming entertainment system according to claim 1, wherein,
   the light adjustment instructions comprise identification (ID) information corresponding to the plurality of light devices, and or the sound adjustment instructions comprise identification (ID) information corresponding to the plurality of audio devices.

4. The e-gaming entertainment system according to claim 2, wherein,
   the light adjustment instructions comprise identification (ID) information corresponding to the plurality of light devices, and or the sound adjustment instructions comprise identification (ID) information corresponding to the plurality of audio devices.

* * * * *